US008401784B2

(12) United States Patent
Kindo et al.

(10) Patent No.: US 8,401,784 B2

(45) Date of Patent: Mar. 19, 2013

(54) COURSE EVALUATION APPARATUS AND COURSE EVALUATION METHOD

(75) Inventors: Toshiki Kindo, Yokohama (JP); Kazuaki Aso, Susono (JP); Katsuhiro Sakai, Hadano (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 484 days.

(21) Appl. No.: 12/814,582

(22) Filed: Jun. 14, 2010

(65) Prior Publication Data

US 2010/0318240 A1 Dec. 16, 2010

(30) Foreign Application Priority Data

Jun. 12, 2009 (JP) ................................ 2009-141084

(51) Int. Cl.
*F41G 9/00* (2006.01)
*G06F 17/10* (2006.01)
*G06G 7/78* (2006.01)

(52) U.S. Cl. .............. 701/302; 701/23; 701/25; 701/26; 701/117; 701/301; 180/167; 180/169; 340/435; 340/436

(58) Field of Classification Search ................ 701/1, 23, 701/25–27, 117, 119, 400, 300, 301, 302; 180/167–169; 342/61, 70–72; 340/425.5, 340/435, 436, 463–467
See application file for complete search history.

(56) References Cited

U.S. PATENT DOCUMENTS

| | | | | |
|---|---|---|---|---|
| 6,049,756 | A * | 4/2000 | Libby | 701/301 |
| 8,019,475 | B2 * | 9/2011 | Kuroda | 700/255 |
| 8,244,408 | B2 * | 8/2012 | Lee et al. | 700/301 |
| 2009/0024357 | A1 * | 1/2009 | Aso et al. | 702/181 |
| 2009/0162825 | A1 | 6/2009 | Sakai et al. | |
| 2011/0071731 | A1 * | 3/2011 | Eidehall et al. | 701/42 |

FOREIGN PATENT DOCUMENTS

| | | | |
|---|---|---|---|
| JP | 2007230454 | A | 9/2007 |
| JP | 2009157502 | A | 7/2009 |

* cited by examiner

*Primary Examiner* — Thomas Tarcza
*Assistant Examiner* — Rami Khatib
(74) *Attorney, Agent, or Firm* — Gifford, Krass, Sprinkle, Anderson & Citkowski, P.C.

(57) ABSTRACT

A course evaluation that evaluates a course of a mobile unit includes: generating a predetermined first course of the mobile unit; generating, for the first course, a second course for which a controlled amount of the mobile unit after a predetermined driving condition is satisfied is increased as compared with a controlled amount of the mobile unit on the first course; estimating another object course, which is a course of another object; determining whether the second course interferes with the other object course; and evaluating a degree of safety of the first course on the basis of a result of determination as to whether the second course interferes with the other object course.

20 Claims, 4 Drawing Sheets

COURSE EVALUATION APPARATUS AND COURSE EVALUATION METHOD

RELATED APPLICATION

This application claims priority to Japanese Patent Application No. 2009-141084 filed on Jun. 12, 2009, which is incorporated herein by reference.

BACKGROUND OF THE INVENTION

1. Field of the Invention

The invention relates to a course evaluation apparatus and course evaluation method that evaluate a course generated and, more particularly, to a course evaluation apparatus and course evaluation method that evaluate a course of a mobile unit, such as a vehicle.

2. Description of the Related Art

In an existing art, a course setting apparatus is known as a course evaluation apparatus that evaluates a course of a mobile unit (see, for example, Japanese Patent Application Publication No. 2007-230454 (JP-A-2007-230454)). The course setting apparatus evaluates courses along which a specific object included in a plurality of objects can travel, and then sets a course of the specific object. In the course setting apparatus, changes in positions, at which the plurality of objects can be located over time, are generated as trajectories on a time space constituted of time and space. The trajectories are used to estimate courses of the plurality of objects, and then the degrees of interference between the courses along which the specific object can travel and the courses along which the other objects can travel are quantitatively calculated on the basis of the estimated courses of the plurality of objects. After that, the course, along which the specific object is least likely to interfere with the other objects, is determined as an appropriate course for the specific object.

However, in the course setting apparatus described in JP-A-2007-230454, setting the course of the specific object requires the fact that the course is least likely to cause interference between the specific object and the other objects. Therefore, this does not take into consideration, for example, driving efficiency at the time when a mobile unit, which is the specific object, travels. Thus, the driving efficiency of the mobile unit may possibly be impaired despite little likelihood of interference with the other objects.

SUMMARY OF THE INVENTION

The invention provides a course evaluation apparatus and course evaluation method that allow a mobile unit to avoid interference with another object with a high driving efficiency, and that are able to evaluate a course of the mobile unit while achieving both driving efficiency and interference avoidance.

A first aspect of the invention relates to a course evaluation apparatus that evaluates a course of a mobile unit. The course evaluation apparatus includes: a first course generation unit that generates a predetermined first course of the mobile unit; a second course generation unit that generates, for the first course, a second course for which a controlled amount of the mobile unit after a predetermined driving condition is satisfied is increased as compared with a controlled amount of the mobile unit on the first course; another object course estimation unit that estimates another object course, which is a course of another object; an interference determination unit that determines whether the second course interferes with the other object course; and a safety evaluation unit that evaluates a degree of safety of the first course on the basis of a result of determination as to whether the second course interferes with the other object course.

When the degree of safety of the first course is evaluated so as to employ a course that is less likely to cause interference with another object, the evaluation is made so as not to employ, for example, a course that can avoid interference with another object when hard control is conducted on the mobile unit. Therefore, it is forced to select a course of which the driving efficiency of the mobile unit is low. In terms of this point, the course evaluation apparatus according to the first aspect generates, for the first course, the second course for which the controlled amount of the mobile unit after a predetermined driving condition is satisfied is increased as compared with that of the first course, and estimates another object course, which is a course of another object. Then, the degree of safety of the first course is evaluated on the basis of the result of determination as to whether the second course interferes with the other object course. Therefore, even when the mobile unit is likely to interfere with another object, the first course that can avoid the interference when hard control is conducted in the second course may be evaluated as a course that is less likely to cause interference. Thus, it is possible to allow a mobile unit to avoid interference with another object with a high driving efficiency, and it is possible to evaluate a course of the mobile unit while achieving both driving efficiency and interference avoidance.

In the first aspect, the predetermined driving condition may be at least one of a driving time of the mobile unit and a driving distance of the mobile unit.

In this way, a driving time or driving distance of the mobile unit may be suitably used as the predetermined driving condition.

In the first aspect, the controlled amount of the mobile unit may include at least one of a deceleration of the mobile unit and a steering speed of the mobile unit.

In this way, the deceleration or steering speed of the mobile unit may be suitably used as the controlled amount of the mobile unit.

In the first aspect, the other object course estimation unit may estimate a course, along which the other object approaches the mobile unit, as the other object course.

When another object travels along a course that approaches the mobile unit, the mobile unit is highly likely to interfere with the other object. Therefore, by estimating a course of another object when the other object approaches the mobile unit as another object course, it is possible to accurately evaluate a course that avoids interference between the mobile unit and the other object.

The first aspect may further include another object maximum speed acquisition unit that acquires another object maximum speed, which is a maximum speed that the other object can travel at. In this case, the other object course estimation unit may estimate a course, along which the other object approaches the mobile unit at the other object maximum speed, as the other object course.

When the other object travels along a course along which the other object approaches the mobile unit at the other object maximum speed, the mobile unit is highly likely to interfere with the other object. Therefore, by estimating a course of another object when the other object approaches the mobile unit at a maximum speed as another object course, it is possible to accurately evaluate a course that avoids interference between the mobile unit and the other object.

In the first aspect, the second course generation unit may generate a plurality of the second courses, and the safety evaluation unit may evaluate the degree of safety of the first course on the basis of a result of determination as to whether each of the plurality of second courses interferes with the other object course.

In this way, the degree of safety of the first course is evaluated on the basis of the result of determination as to whether each of the plurality of second courses interferes with the other object course. By so doing, it is possible to further accurately determine the degree of safety of the first course.

A second aspect of the invention relates to a course evaluation method that evaluates a course of a mobile unit. The course evaluation method includes: generating a predetermined first course of the mobile unit; generating, for the first course, a second course for which a controlled amount of the mobile unit after a predetermined driving condition is satisfied is increased as compared with a controlled amount of the mobile unit on the first course; estimating another object course, which is a course of another object; determining whether the second course interferes with the other object course; and evaluating a degree of safety of the first course on the basis of a result of determination as to whether the second course interferes with the other object course.

With the course evaluation apparatus and the course evaluation method according to the aspects of the invention, a mobile unit is able to avoid interference with another object with a high driving efficiency, and it is possible to evaluate a course of the mobile unit while achieving both driving efficiency and interference avoidance.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
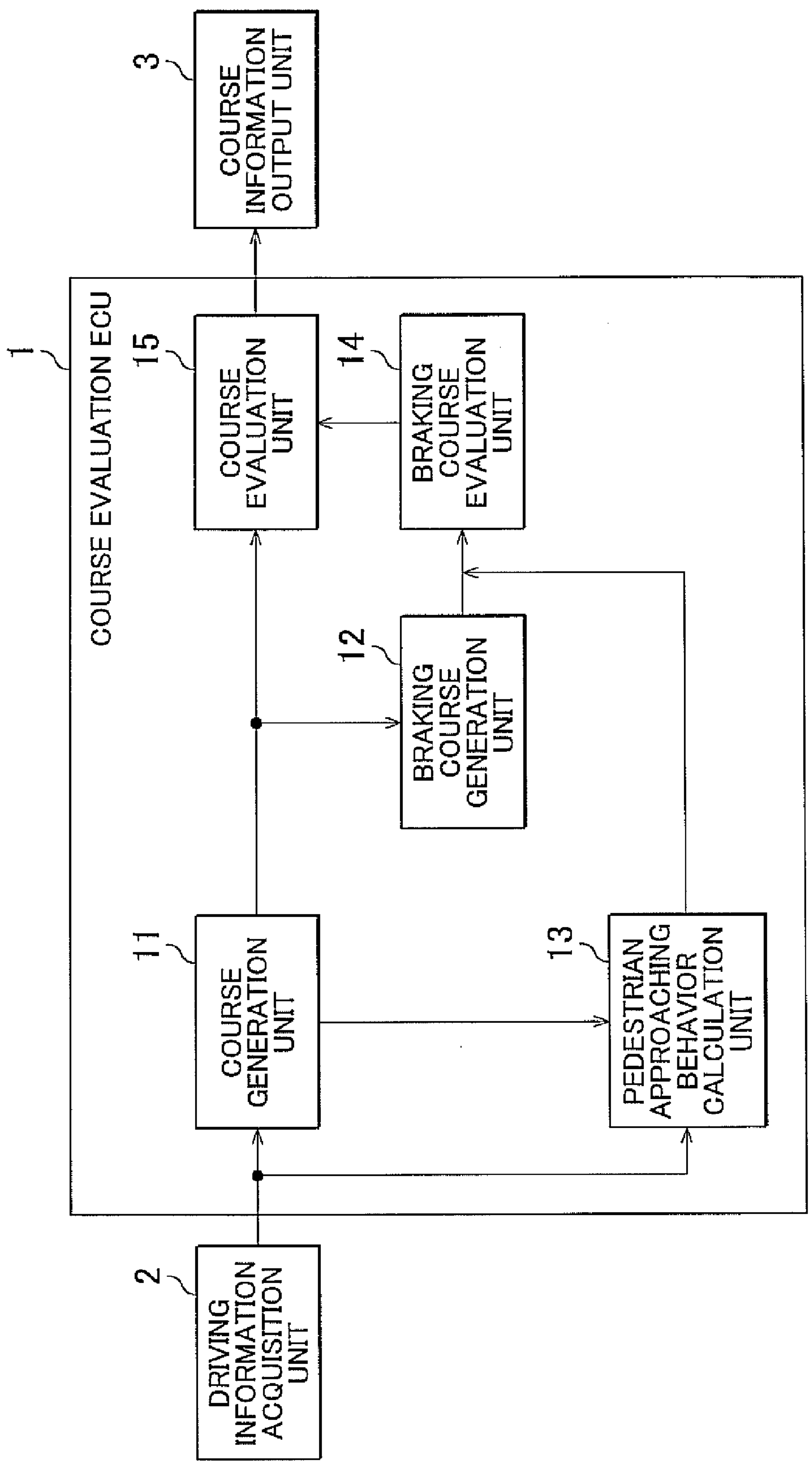
FIG. 1 is a block diagram of a course evaluation apparatus according to an embodiment of the invention.

Hereinafter, an embodiment of the invention will be described with reference to the accompanying drawings. Note that like reference numerals denote the same components in the description of the drawings, and the overlap description is omitted. In addition, for the sake of easy illustration, the ratios of the dimensions of the drawings do not always coincide with those of the description.

A course evaluation apparatus according to the present embodiment is provided for a vehicle that carries out automatic cruising. In this automatic cruising, for example, an environment around a host vehicle is detected to determine an optimal course for driving the host vehicle, and then vehicle control, such as acceleration/deceleration control and steering control, is executed so that the host vehicle travels along the determined course.

In the course evaluation apparatus, a plurality of estimated courses are generated, the degree of safety of each course is evaluated, and then a course evaluated to have the highest degree of safety is determined as the course along which the host vehicle travels. The vehicle equipped with the course evaluation apparatus carries out automatic cruising on the basis of control signals transmitted from the course evaluation apparatus to a drive control unit and steering control unit of the vehicle.

As shown in FIG. 1, the course evaluation apparatus according to the present embodiment includes a course evaluation electronic control unit (ECU) 1. A driving information acquisition unit 2 and a course information output unit 3 are connected to the course evaluation ECU 1.

The course evaluation ECU 1 is, for example, mainly formed of a computer that includes a central processing unit (CPU), a read only memory (ROM) and a random access memory (RAM). In addition, the course evaluation ECU 1 includes a course generation unit 11, a braking course generation unit 12, a pedestrian approaching behavior calculation unit 13, a braking course evaluation unit 14 and a course evaluation unit 15. The course generation unit 11 serves as a first course generation unit. The braking course generation unit 12 serves as a second course generation unit. The pedestrian approaching behavior calculation unit 13 serves as another object course estimation unit. The braking course evaluation unit 14 serves as an interference determination unit. The course evaluation unit 15 serves as a safety evaluation unit.

The driving information acquisition unit 2 acquires driving information that includes vehicle driving information, such as the speed and steered angle of the vehicle, surrounding information obtained by sensing the positions, speeds, and the like, of objects and/or other vehicles around the vehicle, and driving road information, such as a map. The driving information acquisition unit 2, for example, acquires driving information in such a manner that signals of sensors and navigation system that are installed in the vehicle are input to the driving information acquisition unit 2. The driving information acquisition unit 2 transmits the acquired driving information to the course evaluation ECU 1.

The course generation unit 11 of the course evaluation ECU 1 generates a plurality of estimated courses of the host vehicle on the basis of information of a shape, or the like, of a road around the host vehicle, included in the driving information transmitted from the driving information acquisition unit 2. The course generation unit 11 outputs host vehicle course signals, corresponding to the plurality of generated estimated courses of the host vehicle, to the braking course generation unit 12 and the course evaluation unit 15.

The braking course generation unit 12 generates braking courses of the host vehicle on the basis of the host vehicle course signals output from the course generation unit 11. Here, the braking course means a course along which the host vehicle travels when applying brakes with a maximum braking force after a predetermined period of time has elapsed from a current time. The braking course generation unit 12 generates respective braking courses for the plurality of estimated courses of the host vehicle. The braking course generation unit 12 outputs braking course signals, corresponding to the generated braking courses, to the braking course evaluation unit 14.

Figure 2:
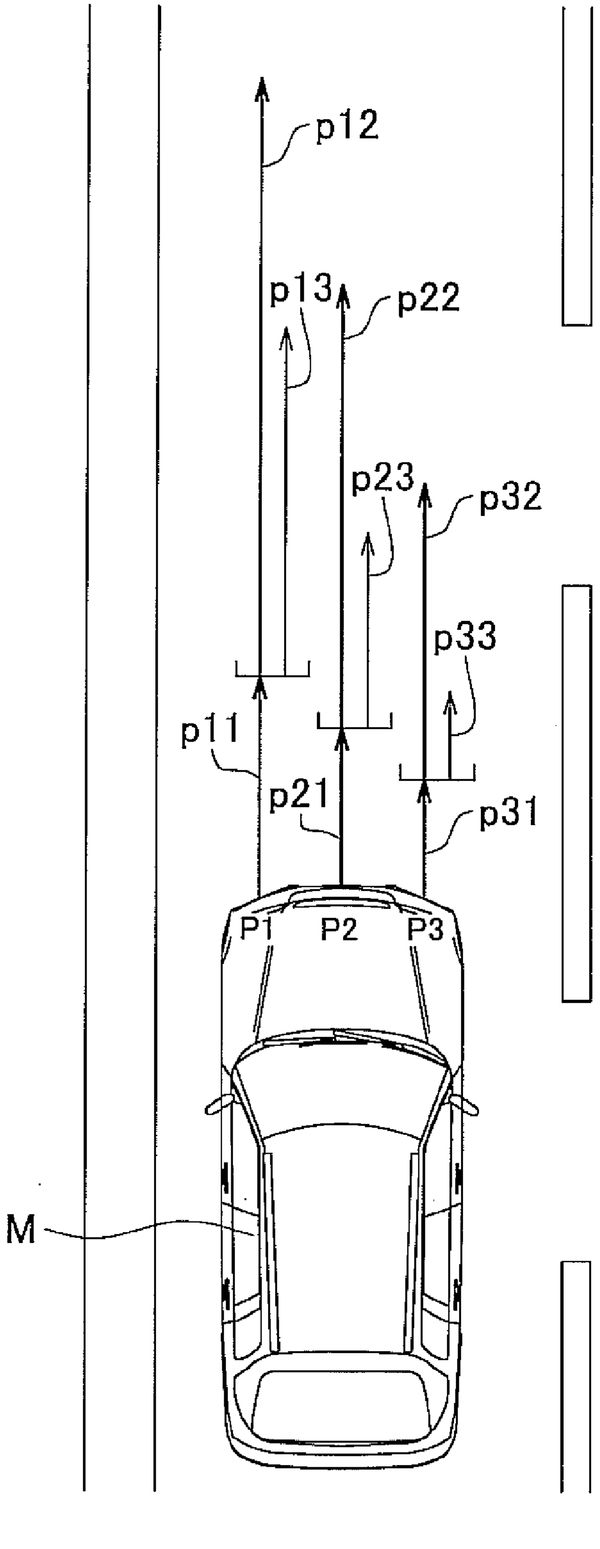
FIG. 2 is a view that illustrates generation of estimated courses in the course evaluation apparatus according to the embodiment of the invention.

For example, in the course generation unit 11, as shown in FIG. 2, the location of a vehicle M is set as a starting point, and then a plurality of, for example, three, estimated courses P1 to P3 from the starting point are generated. The order of decreasing driving efficiency of these three estimated courses is the first estimated course P1, the second estimated course P2 and the third estimated course P3.

Here, the first estimated course P1 is formed of a first immediate course p11 up to a lapse of a predetermined period of time and a first succeeding course p12 after the lapse of the predetermined period of time. In addition, the second estimated course P2 is formed of a second immediate course p21 up to a lapse of the predetermined period of time and a second succeeding course p22 after the lapse of the predetermined period of time. Furthermore, the third estimated course P3 is formed of a third immediate course p31 up to a lapse of the predetermined period of time and a third succeeding course p32 after the lapse of the predetermined period of time.

Subsequently, the braking course generation unit 12 generates a first braking course p13 following the first immediate course p11 for the first estimated course P1. Similarly, the braking course generation unit 12 generates a second braking course p23 following the second immediate course p21 for the second estimated course P2. Furthermore, the braking course generation unit 12 generates a third braking course p33 following the third immediate course p31 for the third estimated course P3. These estimated courses P1 to P3 each correspond to a first course according to the aspect of the invention. In addition, the braking courses p13 to p33 each correspond to a second course according to the aspect of the invention.

The pedestrian approaching behavior calculation unit 13 detects a pedestrian around the host vehicle on the basis of the driving information transmitted from the driving information acquisition unit 2. Furthermore, the pedestrian approaching behavior calculation unit 13 estimates the behavior of the detected pedestrian and then calculates a pedestrian approaching behavior, which is a behavior of the pedestrian approaching the host vehicle.

Here, the pedestrian approaching behavior means a behavior that is most likely to cause interference between the pedestrian and the host vehicle among possible behaviors taken by the pedestrian. An example of the pedestrian approaching behavior is a behavior of a pedestrian approaching the host vehicle. Furthermore, another example is a behavior of a pedestrian approaching the host vehicle at a maximum speed assumed.

The pedestrian approaching behavior calculation unit 13 obtains a pedestrian approaching behavior course, which is a course along which the pedestrian conducts the pedestrian approaching behavior, on the basis of the calculated pedestrian approaching behavior. The pedestrian approaching behavior calculation unit 13 outputs a pedestrian approaching behavior course signal, corresponding to the obtained pedestrian approaching behavior course, to the braking course evaluation unit 14.

The braking course evaluation unit 14 compares the pedestrian approaching behavior course based on the pedestrian approaching behavior course signal output from the pedestrian approaching behavior calculation unit 13 with the braking courses based on the braking course signals output from the braking course generation unit 12, and then determines whether the pedestrian approaching behavior course interferes with each of the braking courses. The braking course evaluation unit 14 generates a braking evaluation value on the basis of the result of determination as to whether the pedestrian approaching behavior course interferes with each of the braking courses. The braking course evaluation unit 14 outputs braking evaluation signals, corresponding to the generated braking evaluation values, to the course evaluation unit 15.

The course evaluation unit 15 evaluates a plurality of courses corresponding to the host vehicle course signals output from the course generation unit 11 on the basis of the braking evaluation value signals output from the braking course evaluation unit 14. The course evaluation unit 15 determines the estimated course having the highest braking evaluation value as the course of the host vehicle as a result of evaluation of the plurality of courses. The course evaluation unit 15 transmits a course evaluation signal, corresponding to the determined course of the host vehicle, to the course information output unit 3.

The course information output unit 3 selects a course, along which the vehicle should travel, on the basis of the course evaluation signal transmitted from the course evaluation ECU 1. The course information output unit 3 transmits course information, corresponding to the selected course, to the drive control unit, steering control unit, and the like, of the vehicle.

Next, the procedure executed by the course evaluation apparatus according to the present embodiment will be described.

Figure 3:
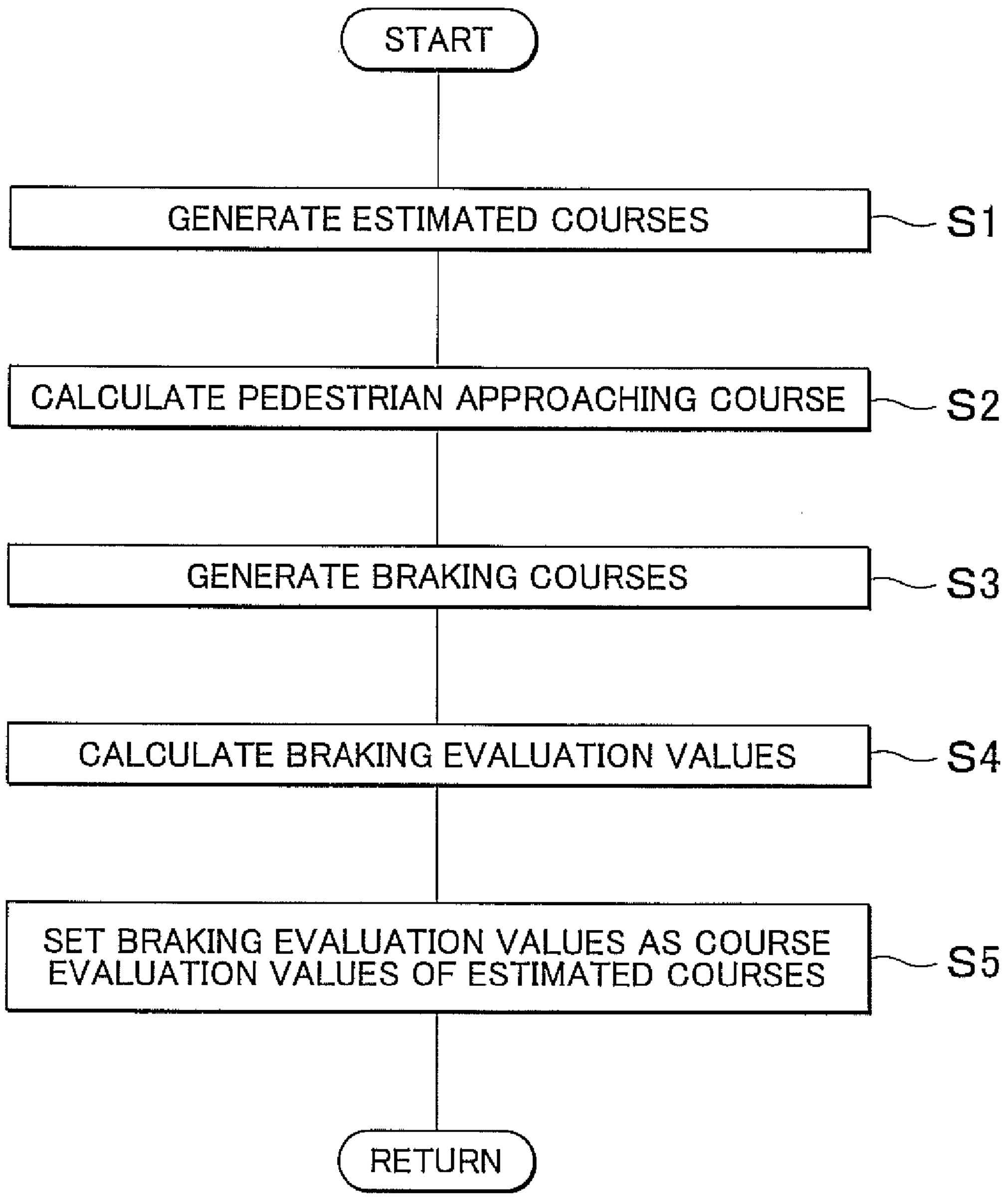
FIG. 3 is a flowchart that shows the procedure executed by the course evaluation apparatus according to the embodiment of the invention.

As shown in FIG. 3, in the course evaluation apparatus according to the present embodiment, first, the course generation unit 11 generates a plurality of estimated courses (S1). Estimated courses are generated on the basis of driving information transmitted from the driving information acquisition unit 2. After the estimated courses are generated, the pedestrian approaching behavior calculation unit 13 calculates a pedestrian approaching course (S2). The pedestrian approaching course is calculated on the basis of the driving information transmitted from the driving information acquisition unit 2.

Subsequently, the braking course generation unit 12 generates braking courses on the basis of host vehicle course signals output from the course generation unit 11 (S3). The braking courses generated by the braking course generation unit 12 are courses along which the host vehicle travels when applying brakes with maximum braking force after a predetermined period of time has elapsed from a current time. Therefore, as shown in FIG. 2, the first braking course p13 is shorter than the first succeeding course p12. Similarly, the second braking course p23 and the third braking course p33 are respectively shorter than the second succeeding course p22 and the third succeeding course p32.

After the braking courses are generated, the braking course evaluation unit 14 evaluates the braking courses (S4). In evaluation of the braking courses, it is determined whether the pedestrian approaching course interferes with each of the plurality of braking courses. In the interference determination here, it is determined whether the pedestrian approaching course intersects with each of the plurality of braking courses. The degree of safety of each of the braking courses is evaluated on the basis of the result of determination as to whether the pedestrian approaching course interferes with each of the plurality of braking courses.

Figure 4:
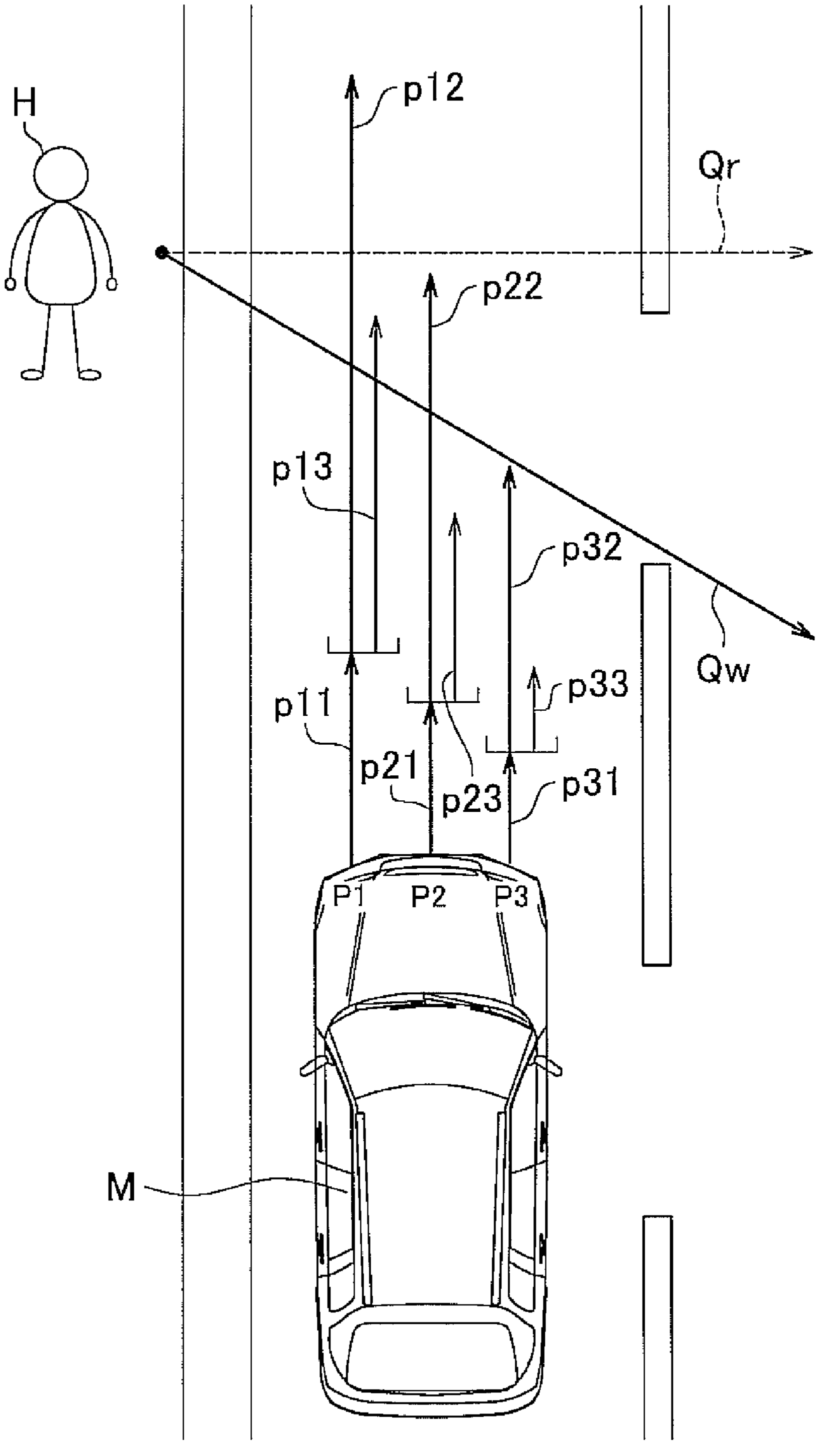
FIG. 4 is a view that illustrates the relationship between the estimated courses and a pedestrian approaching course according to the embodiment of the invention.

For example, specifically, as shown in FIG. 4, it is determined whether a pedestrian approaching course Qw intersects with each of the first braking course p13, second braking course p23 and third braking course p33. In the example shown in FIG. 4, it is determined that the pedestrian approaching course Qw intersects with the first braking course p13, and does not intersect with the second braking course p23 or the third braking course p33.

Therefore, because the degree of safety of the first braking course p13 is low, the braking evaluation value of the first braking course p13 is set to a low evaluation value that indicates a low degree of safety. In addition, because the degrees of safety of both the second braking course p23 and the third braking course p33 are high, the braking evaluation values of the second braking course p23 and third braking course p33 are set to high evaluation values that indicate a high degree of safety.

After the respective braking courses are evaluated in this way, the course evaluation unit 15 sets the braking evaluation values calculated by the braking course evaluation unit 14 as course evaluation values of the estimated courses (S5). Therefore, in the case of an example shown in FIG. 4, the evaluation of the first estimated course P1 is low, and the evaluations of the second estimated course P2 and the third estimated course P3 are high. The course evaluation unit 15 evaluates and determines the second estimated course P2 having a higher driving efficiency between the second estimated course P2 and the third estimated course P3 that are given high evaluations as a course along which the host vehicle M travels, and then transmits a course evaluation signal to the course information output unit 3. After that, the process executed by the course evaluation apparatus ends.

In this way, as shown in FIG. 4, the course evaluation apparatus according to the present embodiment generates the braking courses p13 to p33 for which the braking amounts of the host vehicle M after the predetermined period of time has elapsed are increased as compared with those of the estimated courses P1 to P3, and estimates the pedestrian approaching course Qw. Then, each of the degrees of safety of the estimated courses P1 to P3 is evaluated on the basis of the result of determination as to whether a corresponding one of the braking courses p13 to p33 interferes with the pedestrian approaching course Qw.

Here, for example, it is assumed that each of the degrees of safety of the estimated courses P1 to P3 is evaluated on the basis of determination as to whether each of the estimated courses P1 to P3 interferes with the pedestrian approaching course Qw. In this case, in the first estimated course P1 and the second estimated course P2, it is highly likely to cause interference between a pedestrian H and the host vehicle M, and in the third estimated course P3 it is less likely to cause interference between the pedestrian H and the host vehicle M. Therefore, the evaluations of the first estimated course P1 and second estimated course P2 are low, and the evaluation of the third estimated course P3 is high.

However, when the pedestrian H conducts an approaching behavior, which is a behavior that is highly likely to interfere with the host vehicle M, if a course allows the host vehicle M to avoid interference with the pedestrian H through hard braking, the course is actually less likely to cause interference between the pedestrian H and the host vehicle M.

Then, the course evaluation apparatus according to the present embodiment evaluates the estimated courses P1 to P3 on the basis of determination as to whether each of the braking courses p13 to p33 interferes with the pedestrian approaching course Qw. In this case, it is highly likely to cause interference between the pedestrian H and the host vehicle M when the first estimated course P1 is selected, and it is less likely to cause interference between the pedestrian H and the host vehicle M when the second estimated course P2 or the third estimated course P3 is selected. Therefore, the evaluation of the first estimated course P1 is low, and the evaluations of the second estimated course P2 and third estimated course P3 are high.

Thus, when the estimated courses P1 to P3 are evaluated on the basis of determination as to whether each of the estimated courses P1 to P3 interferes with the pedestrian approaching course Qw, only the evaluation of the third estimated course P3 is high; whereas, when the estimated course P1 to P3 are evaluated on the basis of determination as to whether each of the braking courses p13 to p33 interferes with the pedestrian approaching course Qw, the evaluation of the second estimated course P2 is also high in addition to the third estimated course P3. Therefore, it is possible to avoid interference between the host vehicle M and the pedestrian H and also to give a high evaluation to the second estimated course P2 having a high driving efficiency. Hence, the host vehicle is allowed to avoid interference with the pedestrian with a high driving efficiency, and it is possible to evaluate a course of the host vehicle while achieving both driving efficiency and interference avoidance.

The embodiment of the invention is described above; however, the aspect of the invention is not limited to the above embodiment. For example, in the above embodiment, the course evaluation apparatus is provided for the vehicle that carries out automatic cruising; instead, the course evaluation apparatus may be provided for a vehicle driven by a driver. In this case, the driver may be notified of an evaluated course through a monitor or a speaker.

In addition, in the above embodiment, three estimated courses are generated and compared to evaluate each estimated course; instead, a larger number of estimated courses may be generated and evaluated. Furthermore, in the above embodiment, each braking evaluation value is evaluated on two scales, that is, high and low; instead, each braking evaluation value may be evaluated on multiple number of scales over two scales. Alternatively, each braking evaluation value may be evaluated not on a rating scale but on a numerical scale. When each braking evaluation value is evaluated on a rating scale or a numerical scale, the braking evaluation value may be generated not only on the basis of whether the pedestrian approaching course intersects with the corresponding braking course but also on the basis of a degree of proximity, or the like, between the pedestrian approaching course and the braking course.

Furthermore, in the above embodiment, one braking course is generated for each of the estimated courses P1 to P3; instead, a plurality of two or more braking courses may be generated for each of the estimated courses P1 to P3. When a plurality of braking courses are generated for each estimated course, these plurality of braking courses are compared with the pedestrian approaching course to obtain a braking evaluation value to thereby make it possible to evaluate the estimated course on the basis of the braking evaluation value.

When a braking evaluation value is obtained from a plurality of braking courses, for example, it is applicable that it is determined whether the evaluation of an individual braking evaluation value obtained through the result of comparison between each braking course and the pedestrian approaching course is high or low and then a braking evaluation value is generated in accordance with the ratio of a high evaluation and a low evaluation. Alternatively, it is also applicable that an individual braking evaluation value is obtained on a rating scale or a numerical scale through comparison between each braking course and the pedestrian approaching course and then a braking evaluation value is obtained through calculation, such as adding the individual braking evaluation values.

In addition, in the above embodiment, the predetermined driving condition is a driving time of the host vehicle; instead, the predetermined driving condition may be, for example, another condition, such as a driving distance of the host vehicle. Furthermore, in the above embodiment, the controlled amount of the mobile unit is a deceleration amount of the host vehicle; instead, the controlled amount may be, for example, another controlled amount, such as a steering amount of the host vehicle. Moreover, it is also applicable that the controlled amount may be a combination of a steering amount of the host vehicle and a deceleration amount of the host vehicle.

Furthermore, in the above embodiment, the pedestrian is illustrated as another object; instead, a mobile unit other than the pedestrian may be another object. Specifically, another object may be, for example, another vehicle or an animal other than a human being.

In addition, in the above embodiment, the pedestrian approaching course Qw is used as another object course; instead, it is also applicable that another object course may be a course other than the approaching course, that is, for example, a pedestrian normal course Qr that extends across a lane, on which the host vehicle M travels, substantially perpendicularly with respect to a road as shown in FIG. 4. In this case, in comparison between the pedestrian normal course Qr and the estimated courses P1 to P3, only the evaluation of the first estimated course P1 is low, and the evaluation s of the third estimated course P3 and second estimated course P2 are high. In contrast, in comparison between the pedestrian normal course Qr and the braking courses p13 to p33, all the evaluations of the first estimated course P1 to third estimated course P3 are high. Thus, it is possible to determine the first estimated course P1, having a driving efficiency higher than that of the second estimated course P2, as a course of the host vehicle M. In addition, it is also applicable that another object course may be not only the pedestrian approaching course Qw or the pedestrian normal course Qr but also a pedestrian course between the pedestrian approaching course Qw and the pedestrian normal course Qr. In addition, the shape of another object course may be estimated as not a linear but a shape having a curvature, a wave, or the like.

Furthermore, in the above embodiment, one pedestrian approaching course Qw is generated for each of the estimated courses P1 to P3; instead, for example, it is also applicable that a plurality of behaviors of the pedestrian are estimated and then a plurality of pedestrian approaching courses are generated. Here, when a plurality of pedestrian approaching courses are generated, these plurality of pedestrian approaching courses are compared with each braking course to obtain a braking evaluation value, and then estimated courses may be evaluated on the basis of the corresponding braking evaluation values.

When a braking evaluation value is obtained from a plurality of pedestrian approaching courses for each estimated course, for example, it is applicable that it is determined whether the evaluation of an individual braking evaluation value obtained through the result of comparison between each pedestrian approaching course and the braking course is high or low and then a braking evaluation value is generated in accordance with the ratio of a high evaluation and a low evaluation. Alternatively, it is also applicable that an individual braking evaluation value is obtained on a rating scale or a numerical scale through comparison between each pedestrian approaching course and the braking course and then a braking evaluation value is obtained through calculation, such as adding the individual braking evaluation values.

In addition, in the above embodiment, the moving speed of the pedestrian is not particularly considered; however, it is also applicable that the moving speed of the pedestrian, or the like, is considered. At this time, it is desirable to evaluate a course on the assumption that another object is travelling at its maximum speed. By evaluating a course on the assumption that the travelling speed of another object is maximal, it is possible to estimate a course of the other object, along which the other object reaches a predetermined area around a mobile unit, such as the host vehicle, earliest among courses along which the other object can travel. Thus, it is possible to further desirably prevent interference between the mobile unit and the other object. The maximum speed of the other object may be, for example, prestored in form of a database in accordance with the type of other object.

Furthermore, in the above embodiment, the three estimated courses P1 to P3 are generated as the first courses on the basis of information of a shape, or the like, of a road around the host vehicle; instead, the first courses may be generated on the basis of another condition. For example, the first courses may be generated on the basis of a condition that "the host vehicle travels in the middle of a road at a speed limit". When the first courses are generated on the basis of the above condition, the host vehicle may travel at a speed limit as much as possible, and, when the host vehicle is likely to interfere with another object, the host vehicle may avoid interference in accordance with braking courses. Thus, the host vehicle is able to travel at a high driving efficiency around a speed limit not exceeding the speed limit and is able to avoid interference with another object.

What is claimed is:

1. A course evaluation apparatus that evaluates a course of a mobile unit, comprising:

a first course generation unit that generates a predetermined first course of the mobile unit;

a second course generation unit that generates, for the first course, a second course for which a controlled amount of the mobile unit after a predetermined driving condition is satisfied is increased as compared with a controlled amount of the mobile unit on the first course;

another object course estimation unit that estimates another object course, which is a course of another object;

an interference determination unit that determines whether the second course interferes with the other object course; and a safety evaluation unit that evaluates a degree of safety of the first course on the basis of a result of determination as to whether the second course interferes with the other object course.

2. The course evaluation apparatus according to claim 1, wherein the predetermined driving condition is at least one of a driving time of the mobile unit and a driving distance of the mobile unit.

3. The course evaluation apparatus according to claim 1, wherein the controlled amount of the mobile unit includes at least one of a deceleration of the mobile unit and a steering speed of the mobile unit.

4. The course evaluation apparatus according to claim 1, wherein the other object course estimation unit estimates a course, along which the other object approaches the mobile unit, as the other object course.

5. The course evaluation apparatus according to claim 4, further comprising:

another object maximum speed acquisition unit that acquires another object maximum speed, which is a maximum speed that the other object can travel at, wherein the other object course estimation unit estimates a course, along which the other object approaches the mobile unit at the other object maximum speed, as the other object course.

6. The course evaluation apparatus according to claim 1, wherein the controlled amount of the mobile unit on the second course is increased as compared with a controlled amount of the mobile unit on the first course after the predetermined driving condition is satisfied.

7. The course evaluation apparatus according to claim 1, wherein when the interference determination unit determines whether the second course interferes with the other object course, it is determined whether the second course intersects with the other object course.

8. The course evaluation apparatus according to claim 7, wherein the safety evaluation unit evaluates that the degree of safety of the first course corresponding to the second course is high when it is determined that the second course does not intersect with the other object course, and evaluates that the degree of safety of the first course corresponding to the second course is low when it is determined that the second course intersects with the other object course.

9. The course evaluation apparatus according to claim 1, wherein the first course generation unit generates the first course corresponding to each of a plurality of driving efficiencies.

10. The course evaluation apparatus according to claim 1, wherein the second course generation unit generates a plurality of the second courses, and the safety evaluation unit evaluates the degree of safety of the first course on the basis of a result of determination as to whether each of the plurality of second courses interferes with the other object course.

11. The course evaluation apparatus according to claim 10, wherein the first course generation unit generates the first course corresponding to each of a plurality of driving efficiencies, and the second course generation unit generates the second course corresponding to each of the plurality of first courses.

12. The course evaluation apparatus according to claim 11, wherein the safety evaluation unit evaluates that the degree of safety of the first course corresponding to the second course is high when it is determined that the second course does not intersect with the other object course, evaluates that the degree of safety of the first course corresponding to the second course is low when it is determined that the second course intersects with the other object course, and evaluates the first course, corresponding to a highest driving efficiency among the first courses evaluated to have a high degree of safety, as a course along which the mobile unit travels when a plurality of the first courses are evaluated to have a high degree of safety.

13. The course evaluation apparatus according to claim 1, wherein the other object course estimation unit estimates a plurality of the other object courses.

14. The course evaluation apparatus according to claim 1, wherein the first course generation unit generates the first course on the basis of a condition that the mobile unit travels in the middle of a road at a speed limit.

15. A course evaluation method that evaluates a course of a mobile unit, comprising:

generating a predetermined first course of the mobile unit;

generating, for the first course, a second course for which a controlled amount of the mobile unit after a predetermined driving condition is satisfied is increased as compared with a controlled amount of the mobile unit on the first course;

estimating another object course, which is a course of another object;

determining whether the second course interferes with the other object course; and evaluating a degree of safety of the first course on the basis of a result of determination as to whether the second course interferes with the other object course.

16. The course evaluation method according to claim 15, wherein the predetermined driving condition is at least one of a driving time of the mobile unit and a driving distance of the mobile unit.

17. The course evaluation method according to claim 15, wherein the controlled amount of the mobile unit includes at least one of a deceleration of the mobile unit and a steering speed of the mobile unit.

18. The course evaluation method according to claim 15, wherein a course, along which the other object approaches the mobile unit, is estimated as the other object course.

19. The course evaluation method according to claim 18, further comprising:

acquiring another object maximum speed, which is a maximum speed that the other object can travel at, wherein a course, along which the other object approaches the mobile unit at the other object maximum speed, is estimated as the other object course.

20. The course evaluation method according to claim 15, wherein a plurality of the second courses are generated, and the degree of safety of the first course is evaluated on the basis of a result of determination as to whether each of the plurality of second courses interferes with the other object course.

* * * * *